INVENTORS
MANUEL SELVIN
FRANK S. PRESTON
BY
*Shenier & O'Connor*
ATTORNEYS

INVENTORS
MANUEL SELVIN
FRANK S. PRESTON
BY
*Shenier & O'Connor*
ATTORNEYS

United States Patent Office 3,302,198
Patented Jan. 31, 1967

3,302,198
AUTOMATIC TERRAIN AVOIDANCE SYSTEM
Manuel Selvin, Norwalk, and Frank S. Preston, Fairfield, Conn., assignors to United Aircraft Corporation, East Hartford, Conn., a corporation of Delaware
Filed Mar. 16, 1965, Ser. No. 440,078
14 Claims. (Cl. 343—7)

Our invention relates to an automatic terrain avoidance system and more particularly to an improved system which automatically makes a decision of the best course to be taken considering both the bearing of the terrain relative to the course to the target and the distance of the terrain from the craft.

Various systems are known in the prior art for avoiding obstacles in the path of an aircraft or the like. In such systems range information and elevation information is gathered and the craft is caused to change its altitude to avoid obstacles. Various modifications of systems of this type have been suggested in order to avoid climbing too high and in order to avoid diving when, for example, a hill has been crested. Most of the systems are forward-looking systems in which the fore-and-aft axis of the craft or the ground track is used as a reference. Refinements of these vertical maneuvering systems are incorporated to avoid overstressing of the aircraft or to provide other corrections.

We have invented a system for automatically avoiding terrain which is an improvement over systems known in the prior art. Our system considers the relative position of the terrain to the desired course as well as the elevation and compromises between the necessity for vertical maneuvering and maneuvering in azimuth. We so arrange our system that elevations at a greater distance have lesser significance than those which are close. We artificially increase those elevations requiring a greater heading change over those which do not require a great heading change. Our system is simple in construction and operation for the result achieved thereby.

One object of our invention is to provide an automatic terrain avoidance system which provides maneuvering in azimuth as well as in elevation to avoid high terrain.

Another object of our invention is to provide an automatic terrain avoidance system which compromises between heading change and altitude change in selecting a heading to be taken to avoid terrain.

A further object of our invention is to provide an automatic terrain avoidance system in which elevation data is weighted in accordance with radar distance to the terrain and in accordance with the bearing of the terrain.

Other and further objects of our invention will appear from the following description.

In general our invention contemplates the provision of a terrain avoidance system in which we store a maximum value of elevation for each range sweep with closer points being weighted as more significant than further points. For each azimuth sweep we select the minimum of the previously determined maximum providing additional weight in terms of azimuth for points at greater angles relative to the course than for points at lesser relative angular positions. From the selected minimum a determination is automatically made as to whether or not the heading should be changed.

In the accompanying drawings which form part of the instant specification and which are to be read in conjunction therewith and in which like reference numerals are used to indicate like parts in the various views.

Figure 1:
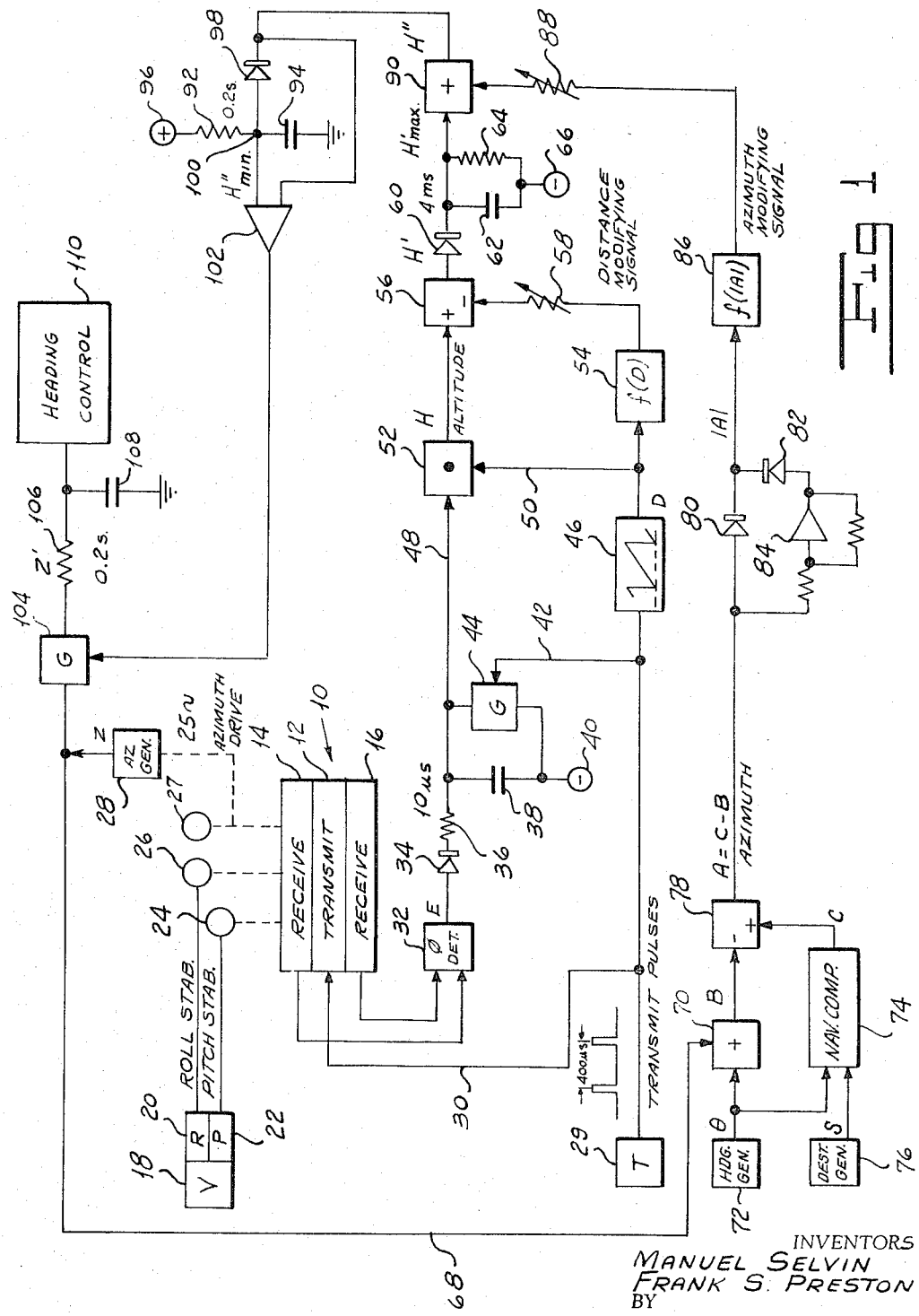
FIGURE 1 is a schematic view of one form of our automatic terrain avoidance system.

Referring now to FIGURE 1 of the drawings, our system includes a transmit-receive unit indicated generally by the reference character 10 comprising a transmit section 12 and upper and lower receiver elements 14 and 16 which produce output signals from which a determination of elevation angle can be made in a manner known to the art. A stabilizing system includes a vertical gyro 18 providing roll and pitch outputs 20 and 22. The roll and pitch outputs provide signals for energizing motors 24 and 26 which stabilize the unit 10. A drive motor 27 oscillates the unit 10 in azimuth at a suitable rate such, for example, as 25 c.p.s. A unit 28 driven by motor 27 provides a signal output which is a measure of the angular position of unit 10.

For purposes of clarity in exposition with reference to FIGURE 1, we have adopted the following notations:

V=vertical gyro
R=roll gyro
P=pitch gyro
T=transmit pulse generator
E=signal indicating elevation angle
C=true course to target signal
G=gating circuit
Z=signal indicating relative azimuth angle of antenna
B=signal indicating true bearing of the antenna
θ=tignal indicating true heading
A=signal indicating angle between antenna and course
D=signal indicating elapsed time from transmitted pulse
H=signal indicating altitude
H'=signal indicating altitude modified as a function of distance
H"=maximum modified altitude signal further modified by the magnitude of the azimuth angle
Z'=signal indicating relative azimuth angle for best heading
S=destination or target coordinates Our system includes a transmit pulse generator 29 which supplies pulses through a channel 30 to the transmit section 12 of the radar set 10. The transmit pulses are selected to have any suitable repetition period such, for example, as 400 μs. In response to a pulse the section 12 emits energy and during the interpulse time reflected energy is received by the upper and lower receiver units 14 and 16. We feed the received information to a circuit 32 which determines the phase difference between the energy received by the upper and lower units to provide an output signal which is a measure of the elevation angle of the point from which radiation is received in a manner known to the art.

We feed the output signal from the circuit 32 through a diode 34 to a low-pass filter comprising a resistor 36 and a capacitor 38 connected between the resistor and a terminal 40 of a suitable source of negative potential. We so select the values of the resistor 36 and the capacitor 38 as to provide a time constant of, for example, 10 $\mu$s. A channel 42 applies the output pulses from the generator 29 to the control terminal of a gating circuit 44 connected across the capacitor 38 to discharge the capacitor at the beginning of each range sweep.

In order to obtain a signal which is a measure of altitude from the elevation angle information at the output of the filter, we first obtain a signal providing a measure of radar distance by applying a pulse from generator 29 to a sawtooth generator 46. Respective channels 48 and 50 apply the output of the low-pass filter including capacitor 38 and the output of generator 46 to the input terminals of a multiplying circuit 52, which provides the output H which is a measure of altitude. The sawtooth signal from generator 46 which is so controlled that the beginning of its rise time corresponds to the transmission of a pulse is a measure of the time which has elapsed since the transmission of a pulse. It will readily be appreciated that this signal is adapted to provide a measure of range or distance to the target area. The coincidence of the signal on channel 48 with the signal on channel 50 is a measure of that distance so that the output of circuit 52 is a measure of altitude. The zero value of the elevation angle of our system is horizontal. The region of interest is from about 5 to 10° above the horizon to about 20° below the horizon. Under these conditions it can be assumed that slant range is equal to ground range and that the altitude for these values is equal to the product of the slant range times the elevation angle since the sine of the angle is approximately equal to the angle for such small values. It is to be noted moreover that we are not concerned with providing a highly accurate altitude signal but merely one which provides a measure of altitude.

In flying over terrain, high objects or high terrain at a great distance is not as significant as is closer terrain. We modify the altitude signal produced by the circuit 52 to weight the signal according to the distance from the target of the terrain providing the signal. In order to achieve this result we apply the distance signal D of the generator 46 to a function generator 54 which produces an output $f(D)$ which is some predetermined function of distance. Generator 54 may be any suitable device known to the art which produces an output voltage which increases with increase in range in accordance with any desired function.

Figure 2:
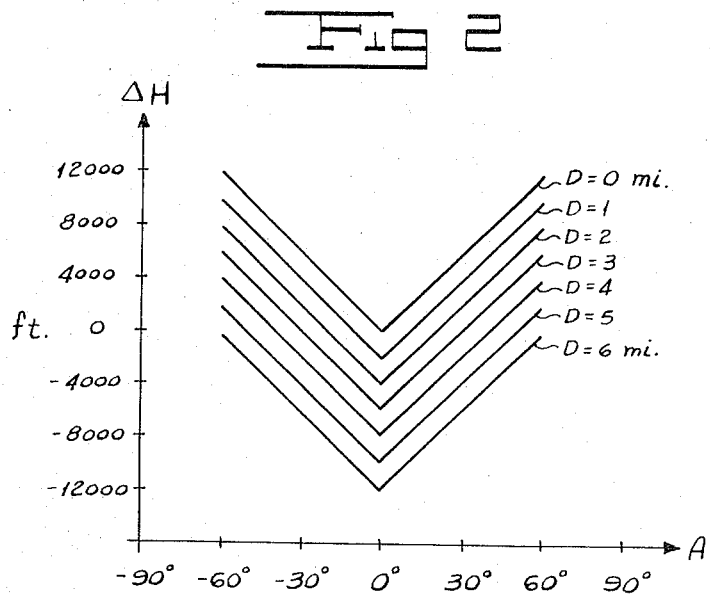
FIGURE 2 is a diagrammatic view illustrating a family of curves of artificial altitude increments versus angle relative to the course to the target.
Figure 3:
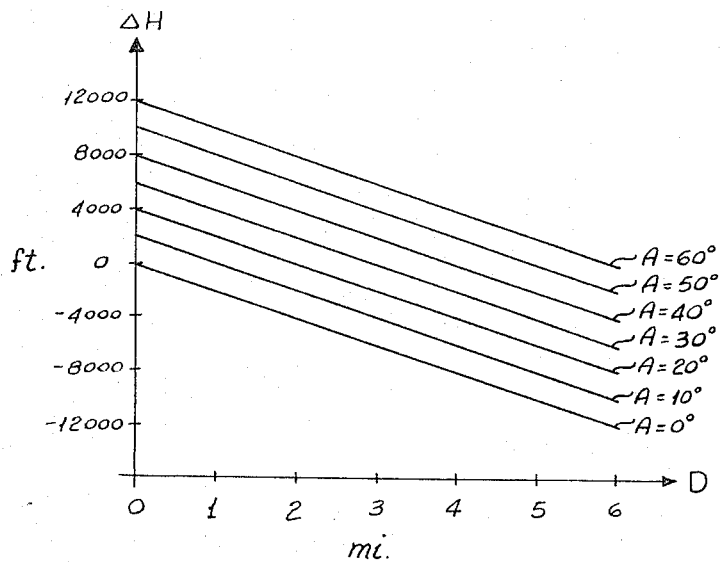
FIGURE 3 is a diagrammatic view illustrating a family of curves of altitude increments for various distances to the target.

It will readily be apparent that we can select any desired function such, for example, as one which is incorporated in the representations shown in FIGURES 2 and 3. From those figures it will be clear that terrain at a greater distance D is considered as being of less significance than is terrain at a closer distance D. That is, we artificially reduce the apparent elevation angle as distance increases. If, for example, a relatively high point of terrain is very far away, we so modify the signal as to make it appear to be less high. In azimuth we make terrain at a greater angle seem higher than it actually is. In this way we are able to select what is the best compromise between a change in course and a change in elevation to follow the terrain while at the same time continuing on our way toward the destination. We apply the altitude signal H to one input terminal of a subtracting network 56. A variable resistor 58 applies the signal $f(D)$ to the other input terminal of the subtracting network 56 to cause the network to provide an output signal H′ which has been modified or weighted in terms of the radar distance. By way of illustration in FIGURE 4 we have shown the altitude information for a range sweep at a particular angle such, for example, as $A$=zero, the significance of which will be apparent from the description given hereinafter.

Figure 4:
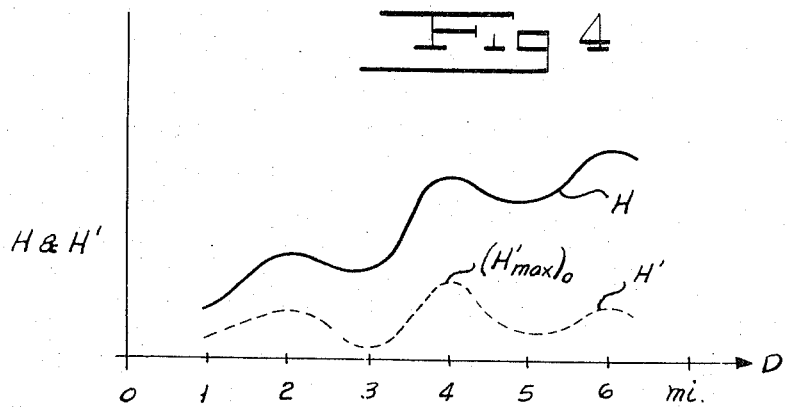
FIGURE 4 is a diagrammatic view illustrating an elevation profile for one range sweep and illustrating the manner in which we artificially modify the profile.

From FIGURE 4 it will be apparent that we have a relatively low peak at a point fairly close, a peak of intermediate size at a further distance and a relatively high peak at a great distance. In FIGURE 4 we have also illustrated the result of modifying the altitude signal as a function of distance by the broken line H′. From that illustration it will be clear that points at a greater distance are considered of less significance. Moreover, from the curve representing the modified signal it will be clear that the most significant point of the modified altitude signal is that corresponding to the intermediate peak. It is this point which we wish to select and store. To accomplish this result we pass the signal H′ from the circuit 56 through a detector 60 to a storage circuit comprising a capacitor 62 and a resistor 64 connected between the output terminal of the diode 60 and the terminal 66 of a suitable source of negative potential. We so select the values of resistor 64 and capacitor 62 as to provide a time constant of, for example, 4 ms. From the structure thus far described, it will be clear that the circuit including capacitor 62 and resistor 64 stores the maximum modified altitude value H′$_{max}$ for a particular range sweep.

In our system we not only weight the received information in accordance with distance but we also weight the information in terms of azimuth to permit an automatic determination of what is a desirable heading for avoidance of terrain. A channel 68 applies the output from the azimuth signal generator to one input terminal of an adder 70. A component 72 of any suitable type known to the art provides an output signal which is a measure of true heading $\theta$ which we apply to the other terminal of the adder 70 to cause the latter to provide an output signal B which is a measure of the true bearing of the antenna.

Our system includes a navigational computer 74 of any suitable type known in the art to one terminal of which we apply $\theta$ and to the other terminal of which we apply the destination coordinates S provided by a component 76. With the inputs described the computer 74 provides an output signal C which is the true course to the destination or target. We apply the respective signals B and C to the input terminals of a subtracter 78 to cause the latter to provide an output signal A which is a measure of the angle between the course and the true bearing of the antenna. As will be described hereinbelow, using this signal A we modify or weight the altitude information in terms of its angular relationship to the destination. We feed the signal A to a first detector 80 and to a second detector 82 through a high-gain inverting operational amplifier 84 to obtain a signal |A| which is a measure of the magnitude of the angular relationship of a point under consideration to the course.

As has been pointed out hereinabove, our system inherently compromises between the altitude change which may be necessary to clear terrain and the heading change which may be required to avoid terrain in azimuth. It will readily be apparent that a small heading change to avoid a high obstacle is preferable to the required great altitude change. On the other hand, a relatively small altitude change is preferable to a relatively large heading change to avoid an obstacle. Having these considerations in mind, it will be apparent that objects at a greater relative angular position to the course should be weighted as being considerably higher than those which are on or nearly on course. Moreover, any terrain which is at a relative angular position of 90 degrees or more may be considered to be indefinitely high, or at least higher than any of the terrain in the area flown, if we are to avoid an azimuth change which would result in flying away from our destination. FIGURES 2 and 3 illustrate curves incorporating such modification of apparent altitude in terms of azimuth as will achieve a result consistent with the requirements outlined above. As will readily be apparent from an examination of those curves, objects at greater angular distances from the course are considered as being appreciably higher than those which are on course.

We apply the signal |A| to a function generator 86 which produces an output which may, for example, be such as incorporates the modification illustrated in FIGURES 2 and 3. Function generator 86 may be similar to function generator 54. It also provides an output voltage which increases with an increase in azimuth angle in accordance with any desired function. However, we add the output of generator 86 rather than subtracting it as in the case of generator 54. This signal $f(|A|)$ is applied by a variable resistor 88 to one input terminal of an adder 90. It will readily be apparent that the variable resistors 58 and 88 permit the modification of the altitude signal to be varied as desired.

Figure 5:
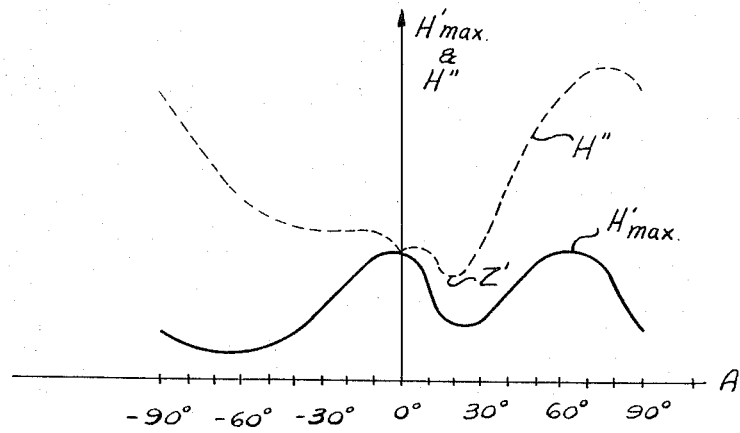
FIGURE 5 is a diagrammatic view of a series of maximum values of weighted altitudes determined in one azimuth sweep and the modified weighted values.

The adder 90 which receives the $H'_{max}$ values and the $f(|A|)$ signal produces the altitude signal $H''$ which has been weighted both for radar distance and for relative bearing to course of the points under consideration. We determine the minimum value of $H''$ and generate such a heading error signal as may be applied to the heading control to change the heading to direct the craft toward that point. A resistor 92 connected in series with a capacitor 94 between a terminal 96 of a suitable source of positive potential and ground provides a reference signal which is compared with the signal $H''$ by means of a diode 98. The arrangement is such that the diode conducts when the reference signal is greater than the value of $H''$. We connect the reference point 100 and the diode output terminal to the input terminals of a differential amplifier 102, the output of which is applied to the input terminal of a gating circuit 104. As long as the signal $H''$ is greater than or equal to the potential at the point 100, diode 98 is nonconductive and the differential amplifier 102 produces no output. As soon as the value of $H''$ drops below that of point 100, diode 98 begins to conduct and owing to the voltage drop across the diode, the amplifier 102 produces an output to render gate 104 conductive. When the gate is rendered conductive it applies the output of generator 28 to the low-pass filter comprising a resistor 106 and a capacitor 108 to feed an error signal $Z'$ to the heading control 110. That is, at a relative bearing at which the condition of the best heading exists, a signal proportional to the output of unit 28 is applied to the heading control. FIGURE 4 illustrates the manner in which the actual altitude values are decreased with increase in distance. In an analogous manner, FIGURE 5 illustrates the manner in which the distance modified altitude values are further modified in azimuth with the point $Z'$ indicating the best choice of courses.

In operation of the form of our terrain avoidance system shown in FIGURE 1, the roll and pitch gyros 20 and 22 energize motors 24 and 26 to stabilize the transmit-receive unit 10 in roll and pitch. Drive motor 27 oscillates the unit 10 in azimuth and also actuates signal generator 28 to cause it to produce an output signal which is a measure of the angular position of the unit 10. Pulse generator 29 produces output pulses having a repetition period as, for example, of 400 μs which is selected considering the desired range of, for example, about 37 miles. The transmit pulses are fed to the transmit section 12 of the unit 10 and the energy received by the upper and lower receiver sections 14 and 16 is fed to the circuit 32 which produces an output signal representative of elevation angle E. The low-pass filter and detector including diode 34, resistor 36 and capacitor 38 stores a maximum value of the elevation angle E. The transmit pulses are fed to the gate 44 to discharge the capacitor 38 at the beginning of each interpulse period. We so select the resistance of resistor 36 and the capacitance of capacitor 38 as to provide a time constant which affords a reasonable discrimination against the carrier frequency while at the same time providing a reasonable rate at which the input information is followed. For example, this circuit may have a time constant of 10 μs. We modify the elevation angle information on channel 48 by a signal proportional to radar distance to give us an indication of elevation H. In order to do this we feed pulses from network 29 to a sawtooth generator 46. We multiply the signal on channel 48 by the output from generator 46 to give us an indication of altitude H at the output of the multiplier 52.

As has been explained hereinabove, objects which are further away are of less interest than are objects of terrain closer to the aircraft. For this reason we modify the altitude signal H in terms of the same function of radar distance. For example, we may modify the altitude signal by a function such as that incorporated in the families of curves shown in FIGURES 2 and 3. To achieve this result we feed the output of the sawtooth generator 46 to a function generator 54 to provide the modifying signal. We then pass the altitude signal H and the distance function signal $f(D)$ to a subtracting network 56 to provide the weighted altitude signal $H'$. A resistor 58 permits the weighting or modifying signal to be varied.

We pass the weighted altitude signals $H'$ through a detector 60 to a storage circuit including capacitor 62 and a resistor 64 to store the maximum modified altitude value $H'_{max}$. The parameters of the circuit including capacitor 62 and resistor 64 are so selected as to provide a time constant which is long enough to prevent any significant loss of the peak value while being short enough so that sufficient values of $H'$ are considered during a range sweep. For example, in one particular instance this circuit may have a time constant of 4 ms.

Both the azimuth signal from the generator 28 and the present true heading are combined in an adder 70 to provide a true bearing signal B. The true heading $\theta$ and the destination coordinates are applied to a computer 74 providing a true course C to the target. A subtracter 78 produces an output which is a measure of the angle A between the course to the target and the true bearing. The inverting amplifier 84 and detectors 80 and 82 extract the magnitude of the angle A as a signal |A|. As is pointed out hereinabove, in order to make a judicious selection of a heading change considering both the height of the object and the relative azimuth angle, we weight the azimuth signal so that objects requiring a greater course change are apparently higher. Function generator 86 modifies the magnitude of the signal representing the angle between the course and the terrain and feeds this signal through a variable resistor 88 to an adder 90. Adder 90 also receives the $H'_{max}$ signal and combines this with the weighted azimuth signal to provide a signal $H''$ which represents the altitude signal weighted both in terms of radar distance and relative angle. We feed this signal to a storage circuit comprising a resistor 92 and capacitor 94 which determines the minimum $H''$ signal. When a change from our stored value occurs, gate 104 is actuated to feed a signal $Z'$ to the heading control 110. That is, whenever amplifier 102 produces an output signal to trigger gate 104 on, such a signal is fed to the heading control 110 as will cause the craft to turn toward that heading corresponding to the particular value of $H''_{min}$ which actuated the gate 104.

In the particular example being considered the circuit comprising resistor 92 and capacitor 94 may have a time constant of, for example, 0.2 second. Similarly, owing to the fact that the circuit including resistor 106 and capacitor 108 is gated on only a very short period of time, it may have a time constant of 0.2 second.

As will be appreciated by those skilled in the ar, once a heading has been selected to clear certain terrain, the particular altitude of terrain clearance can be controlled by any suitable means. It will be appreciated also that we may modify the weights of the function signals introduced circuits 56 and 90 by automatically varying resistors 58 and 88 in response to air speed or ground speed. For example, at low air speeds the values of resistors 58 and 88 may be reduced since more maneuvering is possible at low air speeds. Contrariwise we may increase the values of those resistors at higher air speeds. Further the magnitude of resistor 88 may be controlled in accordance with distance to the target or destination to permit a greater latitude of change of course when far from the destination by increasing the value of resistor 88 and to permit less latitude of change of course when closer to the destination by reducing the value of resistor 88 to steepen the curves of FIGURE 2 and restrict heading change. Finally, the particular constants of the heading control system are selected with reference to such characteristics of the aircraft as permissible maneuvering load factor, rate of climb and the like.

It will be seen that we have accomplished the objects of our invention. We have provided a terrain avoidance system which automatically makes a decision of a heading to be taken to avoid terrain considering both the relative angle of the terrain and the distance thereof. We arrange our system so that relatively distant terrain becomes of lesser significance and terrain at a relatively great angle becomes of greater significance.

It will be understood that certain features and subcombinations are of utility and may be employed without reference to other features and subcombinations. This is contemplated by and is within the scope of our claims. It is further obvious that various changes may be made in details within the scope of our claims without departing from the spirit of our invention. It is, therefore, to be understood that our invention is not to be limited to the specific details shown and described.

Having thus described our invention, what we claim is:

1. A terrain avoidance system for a craft directed along a course over terrain, said craft having a heading control, including in combination, means for producing a first signal representing elevation of terrain, means for producing a second signal which increases as a function of distance to terrain, means for subtracting said second signal from said first signal to provide a third signal, means for detecting the maxima of said third signal, means for producing a fourth signal which increases as a function of the angle between said course and terrain, means for adding said fourth signal to said maxima to produce a modified signal, means for determining the minimum of said modified signal and means responsive to said minimum for actuating said heading control.

2. A terrain avoidance system for a craft directed along a course over terrain, said craft having a heading control, including in combination, means for producing a first signal representing altitude of terrain, means for producing a second signal which increases as a function of distance to terrain, means for subtracting said second signal from said first signal to provide a third signal, means for producing a fourth signal which increases as a function of the magnitude of the angle between said target and said terrain, means for adding said fourth signal to said third signal to provide a modified signal and means responsive to said modified signal for actuating said heading control.

3. A terrain avoidance system for a craft directed along a course over terrain, said craft having a heading control, including in combination means for producing a first signal representing altitude of terrain, means for producing a second signal which increases as a function of the magnitude of the angle between said course and said terrain, means for adding said second signal to said first signal to produce a modified signal and means responsive to said modified signal for actuating said heading control.

4. A terrain avoidance system for a craft directed along a course over terrain, said craft having a heading control, including in combination means for producing a first signal representing altitude of terrain, means for producing a second signal which increases as a function of distance to terrain, means for subtracting said second signal from said first signal to produce a modified signal and means responsive to said modified signal for actuating said heading control.

5. A terrain avoidance system for a craft directed along a course over terrain, said craft having a heading control including in combination, means for producing a signal representing the elevation angle of said terrain for a sector in azimuth over a given distance, means for producing a second signal adapted to provide a measure of distance to said terrain, means responsive to said elevation angle signal and to said second signal for producing a signal representing the elevation of said terrain, means for producing a third signal representing the angle of terrain relative to said course, means responsive to said second signal for modifying said elevational signal to decrease the same as said distance increases, means responsive to said third signal for modifying said elevation signal to increase the same as said relative azimuth increases, means for detecting the minimum of said elevation signal as modified by said second and third signals and means responsive to said detected signal for actuating said heading control.

6. In a terrain avoidance system means for producing a signal representing the elevation of terrain, means for storing the maxima of said signal as a function of terrain and means for determining the minimum of said maxima as a function of azimuth angle of terrain.

7. A terrain avoidance system for a craft having a heading control including in combination, means for producing a signal representing elevation of terrain, means for modifying said signal artifically to increase the altitude represented as the relative azimuth of said terrain increases, means for modifying said signal artificially to decrease the altitude represented as the distance to said terrain increases, and means responsive to said signal as modified in accordance with the relative azimuth of and distance to said terrain for actuating said heading control.

8. A terrain avoidance system for a craft having a heading control including in combination, means for producing a signal representing elevation of terrain, means for modifying said signal as a function of the distance to said terrain, means for modifying said signal as a function of the relative azimuth of said terrain and means responsive to said signal as modified in accordance with the relative azimuth of and distance to said terrain for actuating said heading control.

9. In a terrain avoidance system means for producing a signal representing the elevation of terrain, means for modifying said signal artificially to increase the altitude represented as the location in azimuth of said terrain increases and means for modifying said signal artificially to decrease the altitude represented as the distance to said terrain increases.

10. In a terrain avoidance system means for producing a signal representing the elevation of terrain, means for modifying said signal artificially to decrease the elevation represented as the distance to said terrain increases and means responsive to said modified signal for providing a heading signal.

11. In a terrain avoidance system means for producing a signal representing the elevation of terrain and means for modifying said signal artificially to increase the elevation represented as the location in azimuth of said terrain increases.

12. In a terrain avoidance system means for producing a signal representing the elevation of terrain, means for weighting said signal as a function of the location of said terrain in azimuth and means for weighting said signal as a function of distance to said terrain by artificially decreasing said signal with increasing distance.

13. In a terrain avoidance system means for producing a signal representing the elevation of terrain, means for weighting said signal as a function of distance to said terrain and means responsive to said weighted signal for providing a heading command signal by artificially decreasing said signal with increasing distance.

14. In a terrain avoidance system means for producing a signal representing the elevation of terrain and means for weighting said signal as a function of azimuth by artificially increasing said signal with increasing azimuth.

References Cited by the Examiner
UNITED STATES PATENTS
3,243,802  3/1966  Carver _____ 343—7

CHESTER L. JUSTUS, *Prmary Examiner.*

T. H. TUBBESING, *Assistant Examiner.*